(No Model.)

D. A. SCHOMP.
PUMP FOR DRIVEN WELLS.

No. 263,815.  Patented Sept. 5, 1882.

Witnesses:
Edw. J. Redmond
A. H. Evans

Inventor:
David A. Schomp

UNITED STATES PATENT OFFICE.

DAVID A. SCHOMP, OF MOUNT VERNON, OHIO.

PUMP FOR DRIVEN WELLS.

SPECIFICATION forming part of Letters Patent No. 263,815, dated September 5, 1882.

Application filed February 13, 1882. (No model.)

*To all whom it may concern:*

Be it known that I, DAVID A. SCHOMP, a citizen of the United States, residing at Mount Vernon, in the county of Knox and State of Ohio, have invented certain new and useful Improvements in the Valve of a Driven-Well Pump, of which the following is a specification, reference being had to the accompanying drawings, which form a part hereof.

Figure 1:
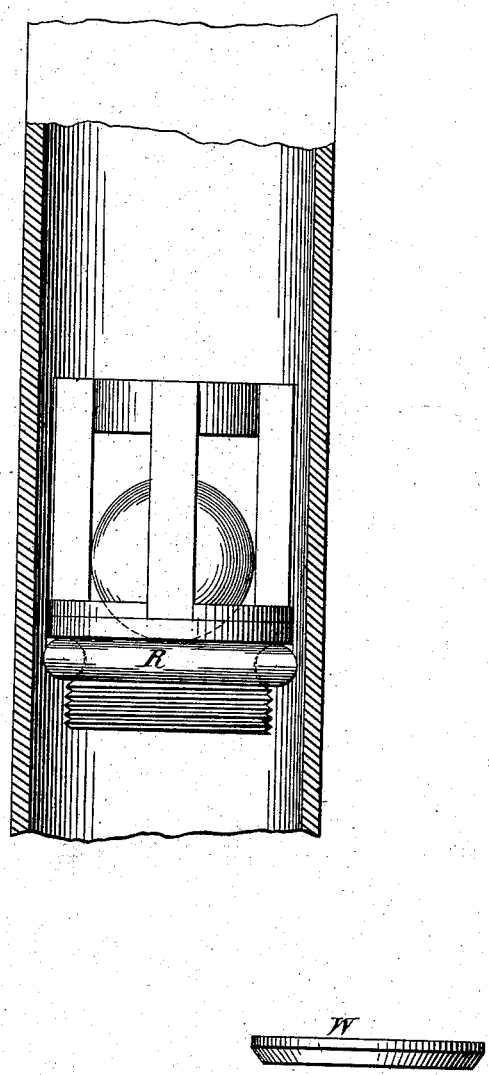
Figure 2:
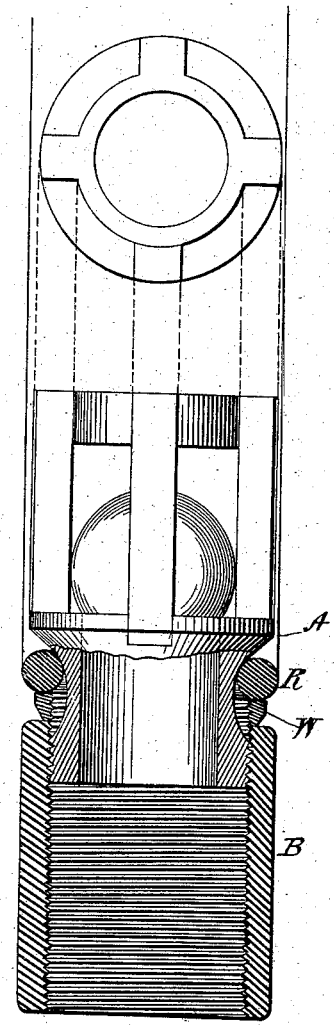

Figure 1 represents the old valve. Fig. 2 represents the old valve with the improvement attached.

In the drawings, A represents the valve, comprising a cage and ball, as shown, and B the short section of tubing into which the valve screws. The joint between these two parts is provided with a rubber ring, R, which as now constructed is caught and pressed up by the flat edge of the short section B, and the result is the ring is soon destroyed by its reducing the frictional action of this section. This difficulty I avoid by introducing the washer W between the upper edge of the section B and the rubber ring to catch the thrust of the section B and the frictional wear. It is evident, however, to all familiar with the construction of drive-wells that a washer of ordinary construction will drop off when the valve is disconnected from the section B and allow the ring to drop into the well, all of which would involve great expense, labor, and loss of time. To overcome these difficulties is the object of my present invention, which consists in a threaded washer introduced above the short section B, and which, when free from the thread of the male screw on said section B, receives the thrust and wear from the edge of the section B, as it is located between the rubber ring and the section. After the washer W passes the screw-threads on the short section B it falls into the concave portion of the valve A, and thus serves to hold the rubber ring R in position when the valve becomes detached from any cause from the short section B. It is thus apparent that the ring R cannot by accident be dropped off the valve A, nor can it be pulled off in raising the valve from the pump-tube, within which the rubber ring R fits snugly, for the purpose of forming a water-tight joint between the valve and the walls of the tube. I am also enabled to fill the space between the rubber ring R and washer with white lead or any other material for the preservation and protection of the rubber ring R; and when the valve is screwed into its seat it forces the washer up against said rubber ring in such a manner as to envelop it with the material placed between said rubber ring and washer for its protection, and forms a perfectly water-tight joint.

Having thus explained my invention, what I claim as new, and desire to secure by Letters Patent, is—

In a pump-valve, the screw-threaded washer W and elastic ring R, in combination with the valve A and short section B, all constructed to operate substantially as and for the purpose set forth.

DAVID A. SCHOMP.

Witnesses:
WILLIAM A. SILCOTT,
CHARLES E. CRITCHFIELD.